United States Patent

Voll

[11] Patent Number: 5,407,002
[45] Date of Patent: Apr. 18, 1995

[54] MULTIPLE-ZONE AIR CIRCULATION CONTROL SYSTEM

[76] Inventor: Christopher J. Voll, 239 Springmount Place, Kitchener, Ontario, Canada, N2A 3V4

[21] Appl. No.: 239,553

[22] Filed: May 9, 1994

[51] Int. Cl.⁶ .......................... F25B 29/00; F24F 3/052
[52] U.S. Cl. ....................... 165/11.1; 165/16; 165/22; 236/49.3; 236/13
[58] Field of Search ................. 165/11.1, 16, 22; 236/49.3, 13

[56] References Cited

U.S. PATENT DOCUMENTS

| | | | |
|---|---|---|---|
| 2,747,842 | 5/1956 | Shataloff | 165/22 |
| 2,872,858 | 2/1959 | Caldwell | 165/22 |
| 3,567,115 | 12/1970 | Nelson | 165/22 |
| 3,568,760 | 3/1971 | Hogel | 165/22 |
| 3,820,713 | 6/1974 | Demaray | 165/22 |
| 3,901,310 | 8/1975 | Strawn | 165/22 |
| 3,915,376 | 10/1975 | Attridge, Jr. et al. | 236/49.3 |
| 3,933,197 | 1/1976 | Zimmer et al. | 165/22 |
| 3,934,795 | 1/1976 | Ginn et al. | 236/13 |
| 3,949,807 | 4/1976 | Tyler | 165/22 |
| 5,024,265 | 6/1991 | Buchholz et al. | 236/49.3 |

*Primary Examiner*—John K. Ford
*Attorney, Agent, or Firm*—R. Craig Armstrong

[57] ABSTRACT

An air circulation system is used to control the temperature in an area defined by a series of zones. The system has a hot deck and a cold deck, and a series of ducts each extending from the downstream side of the decks to a respective zone. A damper in each duct controls the amount of air entering the duct from each deck. The zone having the highest heat load and the zone having the lowest heat load are empirically determined, and a sensor is installed in each of those zones to monitor temperature. A temperature deviation in those zones from a temperature initially set into the system causes the duct dampers to those zones to adjust, and may also cause heat to be supplied or withdrawn from the decks. Each of the remaining zones normally has a temperature between those of the highest and lowest heat load zones. A thermostat and a backup sensor are installed in each of the remaining zones; a thermostat controls only the duct damper leading to the respective zone, and a backup sensor controls only heat supply or withdrawal from the decks. This system has a significant savings in energy cost over other multiple-zone systems, in which each zone has a thermostat controlling both the setting of the respective duct damper as well as the supply or withdrawal of heat from the decks.

8 Claims, 3 Drawing Sheets

MULTIPLE-ZONE AIR CIRCULATION CONTROL SYSTEM

The invention relates to an air circulation control system, in particular, to a system which controls the temperature and quality of circulating air in a multi-zone area by treating the area as a single zone.

Institutions such as schools typically have one or more rooftop air circulation units. Each unit controls air temperatures in the zones defining a multi-zone area of an institution, providing heating or cooling to an individual zone whenever its temperature deviates from a value set on a thermostat in the zone. Air is continuously circulated through an air temperature unit that has a 'hot deck' and a 'cold deck' extending in parallel; heat is supplied to, and removed from, the hot and cold decks respectively according to demand. Such conventional air treatment units typically utilize a thermostat in each room to which air is supplied, and those thermostats usually control both the heating and cooling in the two decks as well as the state of a damper or dampers in the ducts that connect the decks to the room. Many of these systems were placed into institutions that were built in the 'baby-boom years' following the Second World War, and are now in need of being either replaced or retrofitted.

A major difficulty that has been encountered with the aforementioned air temperature units is the uncoordinated way that heating or cooling is supplied to different zones. As an example, one teacher in a school may consider her classroom to be too cold, and turn up the thermostat. The result is that the damper in the duct between her classroom and the two decks is activated to allow in warmer air. In winter months, however, that damper may already be fully open to warm air; in such case, the heating source in the hot deck is activated. The difficulty stems from the fact that the additional heat will also flow to the other classrooms. Another teacher may then decide to turn down the thermostat controlling heat flow to his classroom. The damper in the duct between his classroom and the two decks is activated to allow in cooler air. This may also result in the cooling source in the cold deck being activated to reduce the air temperature in that deck. This results in considerable inefficiency and waste of energy.

The subject invention overcomes this difficulty by in effect treating a multi-zone area in a school or other institution as if it were a single undivided area. A multi-zone area is first tested to determine which zone has the highest heat load, and which has the lowest heat load. The highest heat load zone will typically be a zone that is internal of other zones, for instance, a library centrally located within a school. The lowest heat load zone will typically be that zone which is the least insulated and/or is subjected to strong cold winds across its outer wall. When these two zones within the multi-zone area have been identified, they are used as limiters; i.e. the assumption is made that the heat load requirement of any of the other zones in the multi-zone area will be satisfied if a proper amount of heat is being supplied to the highest and lowest heat load zones.

The control system of the air temperature unit is then modified such that the temperature within the highest and lowest heat load zones is set at a certain comfort level, i.e. typically, close to 71° Fahrenheit. This is accomplished by replacing the thermostats in those two zones with sensors that feed temperature information to the control system, but which cannot be adjusted by occupants in those zones. To maintain the same temperature in both zones, the lowest heat load zone has to be supplied in cold weather with a greater amount of heat than the highest heat load zone. The 'remaining zones' should each have a heat load requirement somewhere between that of the other two zones. A 'backup sensor' is placed into each remaining zone, and allows the temperature in each zone to be monitored by the system. The system is activated to heat or cool a zone if the backup sensor in that zone indicates that the temperature has moved out of an acceptable range of temperatures. This might occur, for example, if a teacher leaves windows open in her classroom overnight in cold weather. In such case, the classroom temperature could drop to 67° F. or lower, even though the highest and lowest heat load zones are at approximately 71° F. When the control system senses that the room temperature has dropped below the lower limit of a temperature range of perhaps 68° F. to 74° F., the control system turns on the heating source until such time as the sensor in the room indicates that the room temperature has moved back within the range.

A thermostat is left in place in each of the remaining zones; they allow an occupant in each zone to modify zone temperature to meet the occupant's comfort level. When a teacher adjusts a classroom thermostat upward, the damper in the duct separating that room from the two decks is activated to open further to the hot deck and simultaneously close by an equal amount to the cold deck. Unlike existing air temperature systems, thermostats in the system of the subject invention cannot activate the heating and cooling sources in the hot and cold decks; only the two sensors in the highest and lowest heat load zones, and the backup sensors, can activate the heating and cooling sources.

The invention may take the form of an air circulation system which is installed in a new building, or the form of a new control system which is installed during retrofitting of an existing air circulation system.

In one form, the invention is an electrically-controlled multi-zone air circulation system for controlling the temperature and quality of circulating air. The system comprises, firstly, an inlet plenum upstream of a hot deck and a cold deck extending in parallel. The hot and cold decks have a heating source and a cooling source, respectively. The system also comprises a series of air ducts, each extending from the downstream side of the hot and cold decks to a respective one of the zones. The system also has a series of air duct dampers. Each air duct damper is located in a respective one of the air ducts, and controls the relative amounts of air passing through that duct from the hot and cold decks. A first temperature sensor is placed in that one of the zones having the highest heat load. The first sensor controls the state of the air duct damper associated with that zone as well as the state of the heating and cooling sources. A second temperature sensor is placed in that one of the zones having the lowest heat load, and controls the state of the air duct damper associated with that zone and also the state of the heating and cooling sources. In each of the zones, except those zones having the first and second sensors, the system also has a thermostatic device and a backup temperature sensor. Each thermostatic device controls the state of the air duct damper associated with the zone, but not the state of the heating and cooling sources. Each backup sensor is capable of controlling the state of the heating and cooling sources in a zone if the temperature in that zone moves below or above a first range, but does not control the state of air duct damper associated with that zone. The system also has a fresh air damper in the inlet plenum to allow fresh outside air to enter the system; that damper is activated by either an air quality monitor in the inlet plenum or by one of the sensors. The air quality monitor opens the fresh air damper if the air quality in the system falls below a defined value. The first or second sensor opens the fresh air damper if the temperature of the air in the zone associated with that sensor is above a second defined value while the temperature of the outside air is below a third defined value. A backup sensor opens the fresh air damper if the temperature of the air in the zone associated with that sensor moves above the first range while the temperature of the outside air is below the third defined value.

The air circulation system may also include an alarm mechanism that utilizes a flame relay, latch relay, alarm relay and time delay. The flame relay is adapted to close a multiple-pole switch if difficulty is encountered in changing the state of the heating source. The latch relay has a coil and a contact connected in series across an alternating alarm voltage. The contact of the latch relay is connected in parallel with a first pole of the multiple-pole switch. The alarm relay has a coil and a contact connected in series across the alternating alarm voltage. The time delay relay has a coil and a contact: the coil is connected in parallel with the latch relay coil, and the contact forms a serial connection with the second pole of the multiple-pole switch and with the coil of the alarm relay; the serial connection extends in parallel with the coil of the latch relay. In operation, the coil and contact of the latch relay are activated to place a first voltage across the coil of the time delay relay when the multiple-pole switch closes a first time; that voltage is held after the switch opens. The contact of the time delay relay closes after a first time delay. After a second time delay the coil of the alarm relay is activated if the multiple-pole switch closes a second time. The contact of the alarm relay closes to keep the alarm operating after the switch opens.

The air circulation system may also have a diagnostic arrangement, comprising firstly a series of terminals each connected to an input power monitoring point on a respective powered member of the system and also connected to an output power monitoring point located downstream of that member. The diagnostic arrangement also comprises a cable connected to a controller of the system and selectively connectable to the terminals, and further comprises a program for the controller. The program is capable of determining a problem with the powered members by comparing cable inputs from the terminals with inputs expected from the terminals if the associated powered members are functioning properly.

In another form, the invention is a modified control arrangement for an existing electrically-controlled multi-zone air circulation system of the type having: an inlet plenum, a hot deck and a cold deck extending in parallel downstream of the inlet plenum, an air duct with a damper extending to each zone from downstream of the decks, a thermostatic device in each zone controlling the associated duct damper and heating and cooling sources in the decks, and a fresh air damper in the inlet plenum. The fresh air damper allows entry of outside air into the system if the air temperature in the system moves above a first defined value.

To implement the modified control arrangement of the invention in such existing system, the zones having the highest and lowest heat loads are first empirically determined through measurements taken over a series of time intervals. The thermostat in each of those two zones is replaced by a sensor. Each of those sensors, the associated duct dampers and the cooling and heating sources are then adjusted to maintain both zones at a chosen temperature . . . say, 71° F. An occupant of either zone has no means to modify that temperature. The connections to the remaining thermostats are modified such that each controls only the state of the associated duct damper and not the state of the heating or cooling source. A backup sensor is then installed in each of the zones, except for the highest and lowest heat load zones. A backup sensor sends a signal to the control system if the temperature in the associated zone moves outside of a defined temperature range, and can control the state of the heating and cooling sources but not the duct damper associated with that zone. A fresh air damper in the inlet plenum, activated by either an air quality monitor in the inlet plenum or by one of the sensors, allows fresh outside air to enter the system. The air quality monitor opens the fresh air damper if the air quality in the system falls below a defined value. The sensor in the highest heat load zone or the sensor in the lowest heat load zone opens the fresh air damper if the air temperature in that zone is above a second defined value while the outside air temperature is below a third defined value. A backup sensor opens the fresh air damper if the air temperature in the zone associated with the sensor moves above the defined temperature range while the temperature of the outside air is below the third defined value.

The invention will next be further described in terms of a preferred embodiment, utilizing the accompanying drawings in which.

Figure 1:
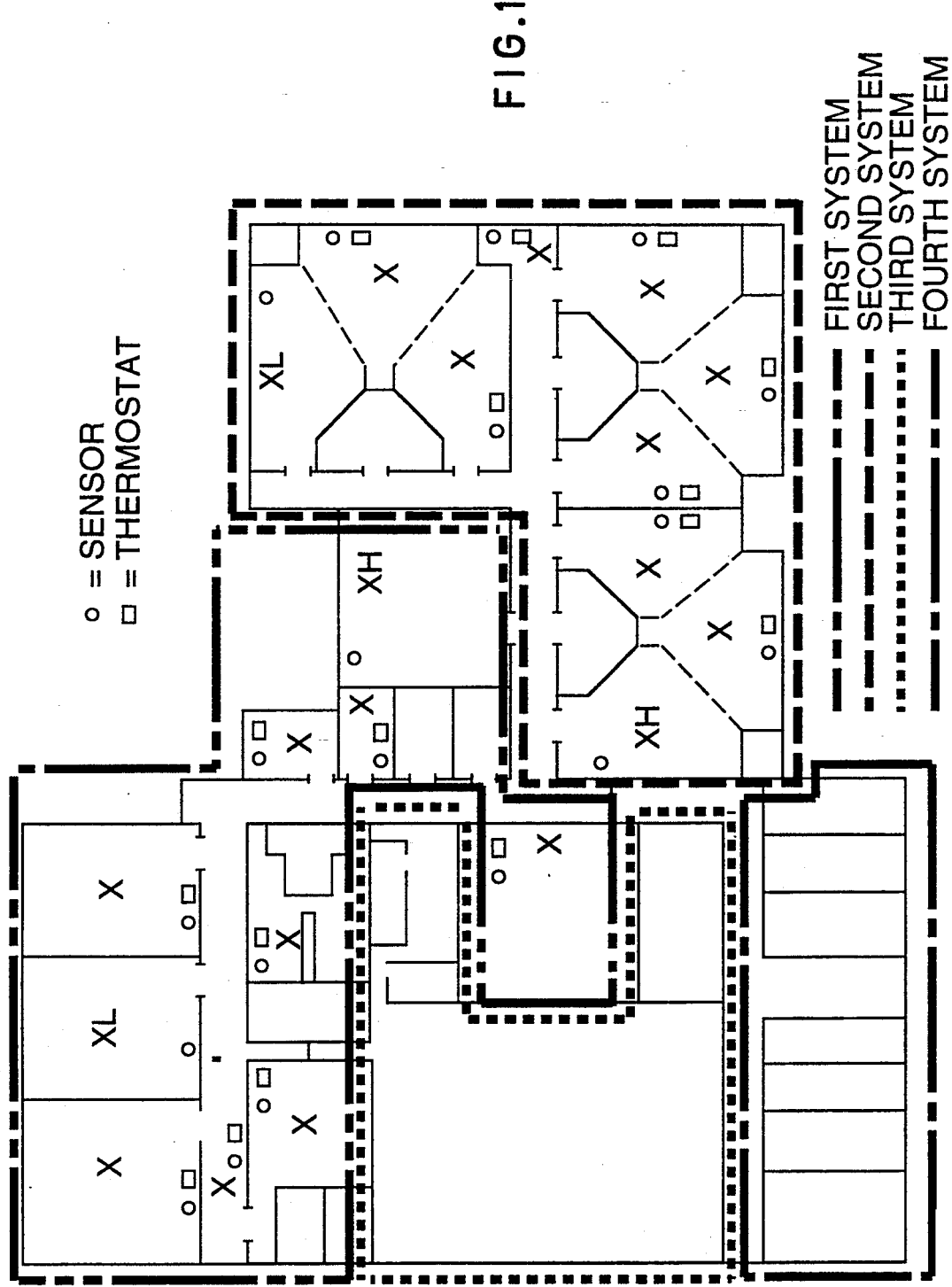
FIG. 1 is a plan view of a school, illustrating the classroom layout and the zones within four air circulation systems within the school.

The school illustrated in FIG. 1 has four existing air circulation systems: a first system with ten zones, a second system with ten zones, a third system for the school gym, and a fourth system for offices in the school. A zone usually corresponds with a classroom, but might also be a hallway or a washroom. This invention relates to a retrofitting of the first and second systems, each of which has a rooftop mechanical system for air circulation similar to that shown in FIG. 2.

Figure 2:
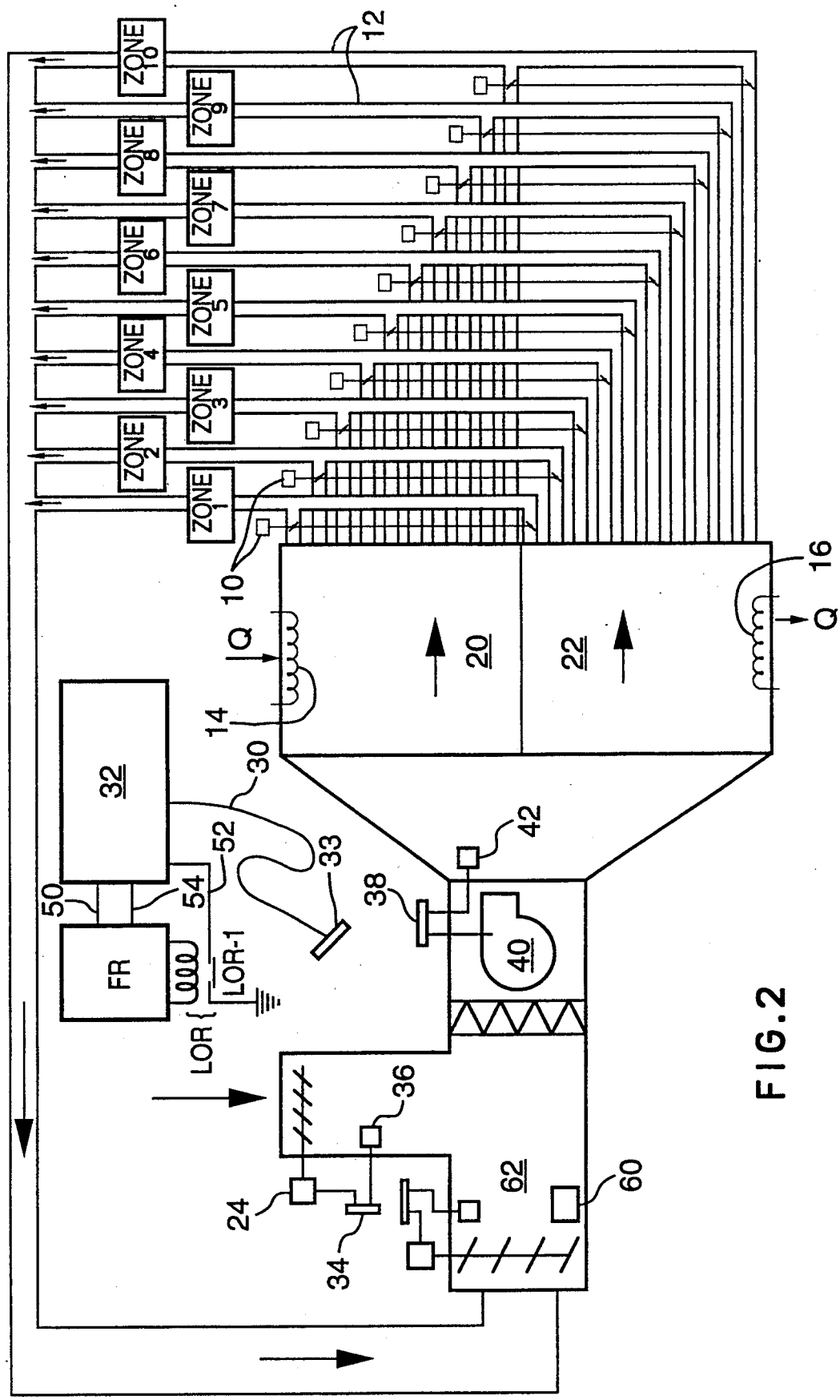
FIG. 2 is a schematic view of the preferred embodiment of the air circulation system of the invention, ten zones being illustrated; and, FIG. 3 is a schematic diagram of an electrical circuit for remotely resetting the preferred embodiment of the air circulation system.

As originally built, the system of FIG. 2 includes a thermostat in each zone to not only control a damper 10 in a duct 12 leading to the particular zone, but also to control a heating source 14 and a cooling source 16. The difficulties with this system have been previously explained.

As a first step in the retrofitting, the highest and lowest heat load zones are determined empirically for each of the first and second systems. In FIG. 1, X designates a zone, and XH and XL respectively designate the highest and lowest heat load zones in each system. In each system the thermostats in the XH and XL zones are replaced with a first and a second temperature sensor, respectively. The other 8 thermostats are not removed, but their function is modified such that each only controls the state of the duct damper 10 associated with the particular zone, In each of the 8 zones where the thermostats remain, a backup sensor is fitted; each backup sensor senses temperatures above or below a defined range.

Once the first or second temperature sensor senses a deviation from its setpoint of say 71° F., duct damper 10 for that XH or XL zone operates to compensate. If that damper has moved to the end of its range, the system activates the heating or cooling source or the fresh air damper. If the sensed temperature is below the setpoint, the system activates heating source 14; if the sensed temperature is above the setpoint, the control system takes one of two actions depending on the outside temperature. The system reads the outside temperature, and if it is 60° F. or less the fresh air damper 24 is opened to allow cold outside air to enter the system. If the outside temperature is above 60° F., instead of opening fresh air damper 24, the control system increases the output of the cooling source 16 in cold deck 22. The thermostats in the eight X zones then compensate for any resulting increase in hot or cold air flowing into those zones by varying the state of associated dampers 10.

If a backup sensor in a zone X senses that the temperature in that zone has moved outside of the set temperature range, the control system does not change the state of the associated duct damper. The system instead causes activation of the heating source or cooling source or fresh air damper in the same way as set out above. The thermostats in the remaining seven X zones may then need to compensate for any increase in hot or cold air.

The air circulation system of the invention has some additional features: a diagnostics capability for analyzing operating problems, and a remote reset capability. Both of these features allow reduced attendance by repair personnel and consequent savings.

As shown in FIG. 2, the diagnostics feature utilizes a multi-wire line 30 that extends from a system controller 32 and has a plug 33 that can be alternately connected with a terminal on each of the various powered members of the system, such as the dampers, motors, the heating source and the cooling source. One of the terminals, designated as 34, is connected to an input power monitoring point on the motor of fresh air damper 24, and is also connected to an air proving switch 36 located downstream of damper 24. A second terminal, designated as 38, is connected to an input power monitoring point on the motor of blower 40, and also connected to an air proving switch 42 located downstream of blower 40. Controller 32 has a program which compares inputs from each terminal with inputs expected if the powered member associated with a terminal is functioning properly. The diagnostics program in controller 32 can sense problems which might otherwise require a continuing period of expensive attendance by a repairman.

Figure 3:
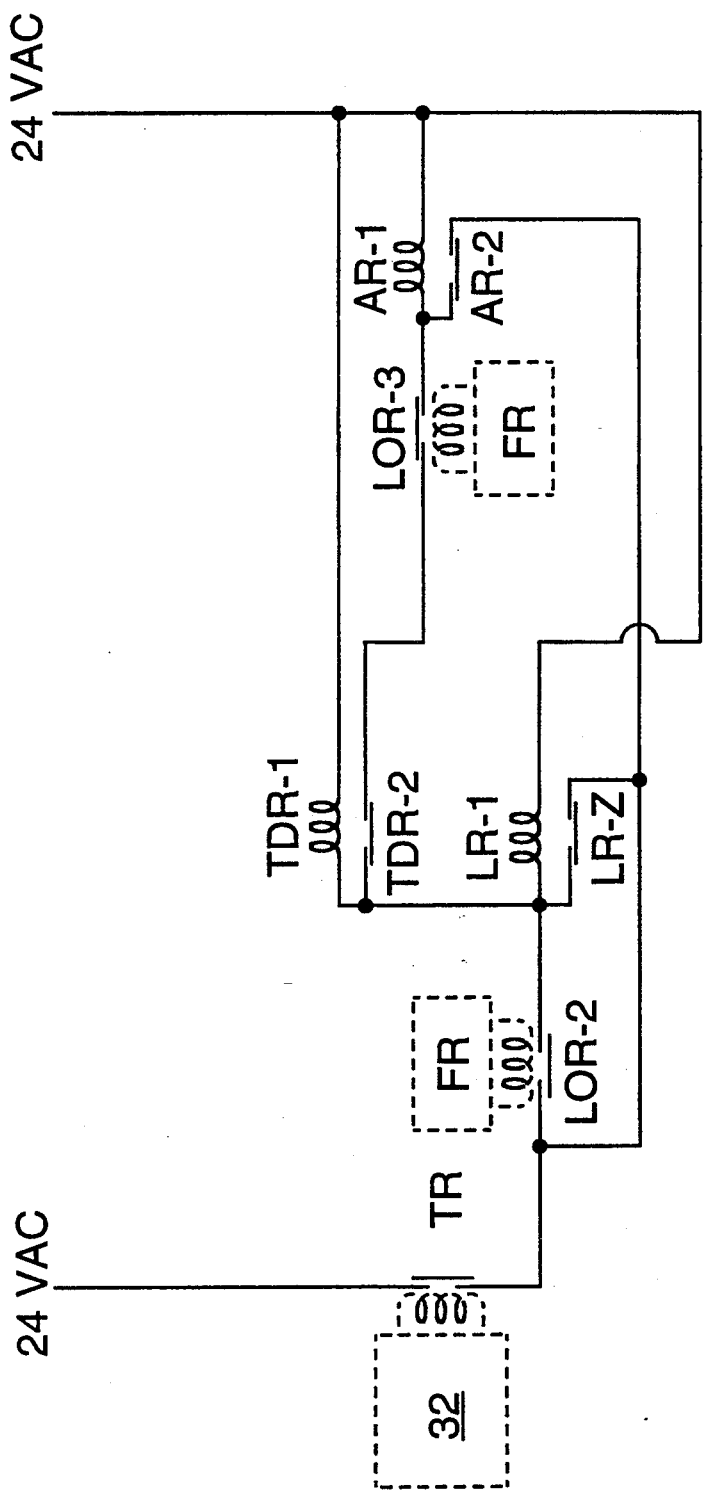

The electrical circuit for the remote reset capability is illustrated in FIGS. 2 and 3. All air circulation systems with a gas heating capability have a flame relay (FR) that ensures that heating system components such as the gas valve, the pilot valve and the flame sensor are operating properly. The system controller 32 uses line 50 to signal flame relay FR to initiate a heating procedure. If flame relay FR detects a problem, it activates a 3-pole single-throw lockout relay LOR having three poles LOR-1, LOR-2 and LOR-3 which simultaneously close. LOR-1 is connected to an input line 52 of controller 32, which makes the controller immediately aware that a problem exists.

Assume that time reset TR is closed. LOR-2 is also closed at this point. The 24-volt alternating voltage then activates the latch relay coil LR-1, which in turn closes the associated latch relay contact LR-2, and also activates the time delay relay coil TDR-1. The contact TDR-2 of time delay relay TDR closes approximately five minutes after the coil TDR-1 of that relay is activated. Shortly after controller 32 becomes aware that a problem exists by reading the LOR-1 input, it resets flame relay FR using reset line 54. That action in turn stops current flowing through LOR, and its poles LOR-1, LOR-2 and LOR-3 open. Though LOR-2 has opened, the current flow is maintained through TR, LR-2 and LR-1.

About five minutes later the contact TDR-2 of the time delay relay TDR closes; at this point LOR-3 is still open. About one minute after TDR-2 closes, i.e. about six minutes after coil TDR-1 was activated, controller 32 uses line 50 again to signal the flame relay FR to initiate the heating procedure a second time. If flame relay FR still detects a problem, it activates relay LOR again and the three poles LOR-1, LOR-2 and LOR-3 close again. Current then flows through TR, LR-2, TDR-2, LOR-3 and alarm relay coil AR-1. Activation of AR-1 activates alarm relay contact AR-2, and current flows through TR, AR-2 and AR-1, which sets off a continuous alarm. The alarm remains on until time reset TR opens, which it does on a signal from controller 32. That signal is automatically sent once a day, but controller 32 can also send such signal any time it receives a phoned-in command to do so.

The flame relay FR is made by Eclipse-Dunga Controls Inc. of Rockford, Ill. under the trade marks TERVON* and VARI-FLAME*, Model 5602. This particular relay can be reset not only by means of an external switch, similar to other relays, but also by interruption of its power supply. That feature makes the above remote reset circuit possible.

* Trade-marks

With reference to FIG. 2, the operation of the air circulation system proceeds as follows. Assume that zones 4 and 8 have been found to be the zones with the highest and lowest heat loads, respectively. The dampers 10 in the ducts 12 leading to zones 4 and 8 are set to be approximately equally open to the hot deck 20 and the cold deck 22. Then heating source 14 or cooling source 16 is adjusted to create the desired temperature (say, 71° F.) in the zones 4 and 8. Controller 32 then operates to maintain that temperature in zones 4 and 8, by adjusting the dampers leading to those zones and, if necessary, by adjusting the heating source 14 or the cooling source 16 or the fresh air damper 24. Without additional adjustment, the temperature in the eight remaining zones would remain at approximately 71° F.

An occupant in a remaining zone may, however, adjust the temperature of that zone within a small range by using the thermostat in that zone; the thermostat has control over the damper in the duct 12 leading to that zone. A backup sensor in each remaining zone signals the controller 32 if the temperature in that zone moves outside of a range extending approximately 3° F. each side of the temperature in the highest and lowest heat load zones (below 68° F. or above 74° F. in this example). The controller 32 moves the temperature in the particular zone back within the temperature range by activating either the heating source 14, cooling source 16 or fresh air damper 24.

Fresh air damper 24 opens to let outside air into the system if the outside air temperature is below a certain value (60° F. in this example), and if (1) the temperature in the highest or lowest heat load zone is above another value (71° F. or 74° F. respectively in this example), or if (2) the temperature in a remaining zone is above the upper limit of a defined range (74° F. in this example).

Fresh air damper 24 opens regardless of the temperature in the zones if a fresh air monitor 60 located in an inlet plenum 62 upstream of hot deck 20 and cold deck 22 indicates that the quality of air circulating in the system has fallen below a defined value. The parameter measured is carbon dioxide ($CO_2$) concentration in parts per million (p.p.m.). The $CO_2$ concentration in outside air is typically about 350 p.p.m. Standard 62-1989 of A.S.H.R.A.E. requires that schools be supplied with at least 15 ft.$^3$/min. of fresh air for every person in the school. To meet that standard, fresh outside air must be introduced into the system if the concentration of $CO_2$ in the air within the system exceeds approximately 825 p.p.m.

What is claimed as the invention is:

1. An electrically-controlled multi-zone air circulation system for controlling the temperature and quality of circulating air, the system comprising:
   an inlet plenum;
   a hot deck having a heating source, and a cold deck having a cooling source, the decks extending in parallel downstream of the inlet plenum;
   a series of air ducts, each air duct extending from the downstream side of the two decks to a respective one of the zones;
   a series of air duct dampers, each air duct damper being located in a respective one of the air ducts and controlling the relative amounts of air passing through that duct from the hot deck and the cold deck;
   a first temperature sensor placed in that one of the zones having the highest heat load, the first sensor controlling the state of the air duct damper associated with that zone and the state of the cooling source;
   a second temperature sensor placed in that one of the zones having the lowest heat load, the second sensor controlling the state of the air duct damper associated with that zone and the state of the heating source;
   a thermostatic device in each zone except those zones having the first and second sensors, each thermostatic device being adjustable by an occupant of a zone for controlling the state of the air duct damper associated with that zone but not the state of the heating source and the cooling source;
   a backup temperature sensor in each zone except those zones having the first and second sensors, a backup sensor activating the system if the temperature in the associated zone moves below or above a first range, each backup sensor controlling the state of the heating source and the cooling source but not the state of the air duct damper associated with that zone; and,
   a fresh air damper in the inlet plenum, that damper allowing fresh outside air to enter the system and being activated by either an air quality monitor in the inlet plenum or by one of the sensors, the air quality monitor opening the fresh air damper if air quality in the system falls below a defined value, the first or second sensor opening the fresh air damper if the temperature of the air in the zone associated with that sensor is above a second defined value while the temperature of the outside air is below a third defined value, a backup sensor opening the fresh air damper if the temperature of the air in the zone associated with that sensor moves above the first range while the temperature of the outside air is below the third defined value.

2. An air circulation system as in claim 1, wherein each zone is a classroom in a school.

3. An air circulation system as in claim 1, and further comprising:
   a flame relay adapted to close a multiple-pole switch if difficulty is encountered in changing the state of the heating source;
   a latch relay having a coil and a contact connected in series across an alternating alarm voltage, the contact of the latch relay being connected in parallel with a first pole of the multiple-pole switch;
   an alarm relay having a coil and a contact connected in series across the alternating alarm voltage; and,
   a time delay relay having a coil and a contact, the coil being connected in parallel with the coil of the latch relay, the contact forming a serial connection with the second pole of the multiple-pole switch and with the coil of the alarm relay, the serial connection extending in parallel with the coil of the latch relay; wherein the coil and contact of the latch relay are activated to place a first voltage across the coil of the time delay relay when the multiple-pole switch closes a first time, that voltage being maintained after the switch opens, wherein the contact of the time delay relay closes after a first time delay, and wherein after a second time delay the coil of the alarm relay is activated if the multiple-pole switch closes a second time, the contact of the alarm relay closing to keep the alarm operating after the switch opens.

4. An air circulation system as in claim 1, and further comprising:
   a series of terminals each connected to an input power monitoring point on a respective powered member of the system and also connected to an output power monitoring point located downstream of that member;
   a cable, connected to a controller of the system and selectively connectable to the terminals; and,
   a program for the controller, capable of determining a problem with the powered members by comparing cable inputs from the terminals with the inputs to be expected from the terminals if the associated powered members are functioning properly.

5. A modified control arrangement for controlling the temperature and quality of circulating air in an electrically-controlled multi-zone air circulation system of the type having:
   an inlet plenum;
   a hot deck having a heating source, and a cold deck having a cooling source, the decks extending in parallel downstream of the inlet plenum;
   a series of air ducts, each air duct extending from the downstream side of the two decks to a respective one of the zones;
   a series of air duct dampers, each air duct damper being located in a respective one of the air ducts and controlling the relative amounts of air passing through that duct from the hot deck and the cold deck;
a thermostatic device in each zone allowing the occupant of that zone to control the air temperature in that zone, each thermostatic device controlling the state of the air duct damper associated with that zone and the state of the heating source and the cooling source; and,
a fresh air damper in the inlet plenum, that damper allowing fresh outside air to enter the system whenever the air temperature in the system moves above a first defined value; the modified control arrangement comprising:
a first temperature sensor placed in that one of the zones having the highest heat load, the first sensor controlling the state of the air duct damper associated with that zone and the state of the cooling source;
a second temperature sensor placed in that one of the zones having the lowest heat load, the second sensor controlling the state of the air duct damper associated with that zone and the state of the heating source;
a thermostatic device in each zone except those zones having the first and second sensors, each thermostatic device being adjustable by an occupant of that zone for controlling the state of the air duct damper associated with that zone but not the state of the heating source and the cooling source;
a backup temperature sensor in each zone except those zones having the first and second sensors, a backup sensor activating the system if the temperature in the associated zone moves below or above a first range, each backup sensor controlling the state of the heating source and the cooling source but not the state of the air duct damper associated with that zone; and,
a fresh air damper in the inlet plenum, that damper allowing fresh outside air to enter the system and being activated by either an air quality monitor in the inlet plenum or by one of the sensors, the air quality monitor opening the fresh air damper if air quality in the system falls below a defined value, the first or second sensor opening the fresh air damper if the temperature of the air in the zone associated with that sensor is above a second defined value while the temperature of the outside air is below a third defined value, a backup sensor opening the fresh air damper if the temperature of the air in the zone associated with that sensor moves above the first range while the temperature of the outside air is below the third defined value.

6. A modified control arrangement as in claim 5, wherein each zone is a classroom in a school.

7. A modified control arrangement as in claim 5, and further comprising:
a flame relay adapted to close a multiple-pole switch if difficulty is encountered in changing the state of the heating source;
a latch relay having a coil and a contact connected in series across an alternating alarm voltage, the contact of the latch relay being connected in parallel with a first pole of the multiple-pole switch;
an alarm relay having a coil and a contact connected in series across the alternating alarm voltage; and,
a time delay relay having a coil and a contact, the coil being connected in parallel with the coil of the latch relay, the contact forming a serial connection with the second pole of the multiple-pole switch and with the coil of the alarm relay, the serial connection extending in parallel with the coil of the latch relay; wherein the coil and contact of the latch relay are activated to place a first voltage across the coil of the time delay relay when the multiple-pole switch closes a first time, that voltage being maintained after the switch opens, wherein the contact of the time delay relay closes after a first time delay, and wherein after a second time delay the coil of the alarm relay is activated if the multiple-pole switch closes a second time, the contact of the alarm relay closing to keep the alarm operating after the switch opens.

8. An air circulation system as in claim 5, and further comprising:
a series of terminals each connected to an input power monitoring point on a respective powered member of the system and also connected to an output power monitoring point located downstream of that member;
a cable, connected to a controller of the system and selectively connectable to the terminals; and,
a program for the controller, capable of determining a problem with the powered members by comparing cable inputs from the terminals with the inputs to be expected from the terminals if the associated powered members are functioning properly.

* * * * *